(12) United States Patent  (10) Patent No.: US 9,091,462 B2
Ratti et al.  (45) Date of Patent: Jul. 28, 2015

(54) SOLAR CANOPY SYSTEMS AND METHODS

(75) Inventors: Carlo F. Ratti, Turin (IT); James Francis Vanzo, Turin (IT)

(73) Assignee: CARLORATTIASSOCIATI SRL (IT)

( * ) Notice: Subject to any disclaimer, the term of this patent is extended or adjusted under 35 U.S.C. 154(b) by 314 days.

(21) Appl. No.: 13/479,039

(22) Filed: May 23, 2012

(65) Prior Publication Data

US 2012/0298180 A1   Nov. 29, 2012

Related U.S. Application Data

(60) Provisional application No. 61/488,928, filed on May 23, 2011.

(51) Int. Cl.

| | |
|---|---|
| *H01L 31/042* | (2014.01) |
| *F24J 2/54* | (2006.01) |
| *F22B 1/00* | (2006.01) |
| *F24J 2/04* | (2006.01) |
| *F24J 2/16* | (2006.01) |
| *F24J 2/38* | (2014.01) |
| *F24J 2/46* | (2006.01) |
| *F24J 2/52* | (2006.01) |

(52) U.S. Cl.
CPC ............ *F24J 2/541* (2013.01); *F22B 1/006* (2013.01); *F24J 2/045* (2013.01); *F24J 2/16* (2013.01); *F24J 2/38* (2013.01); *F24J 2/461* (2013.01); *F24J 2/523* (2013.01); *F24J 2/5241* (2013.01); *H02S 20/00* (2013.01); *F24J 2002/5286* (2013.01); *F24J 2002/5458* (2013.01); *Y02B 10/20* (2013.01); *Y02E 10/44* (2013.01); *Y02E 10/46* (2013.01); *Y02E 10/47* (2013.01); *Y02E 10/52* (2013.01)

(58) Field of Classification Search
USPC .................. 136/205, 206, 210, 230, 245, 259
See application file for complete search history.

(56) References Cited

U.S. PATENT DOCUMENTS

| | | | | |
|---|---|---|---|---|
| 4,068,474 | A * | 1/1978 | Dimitroff | .............. 60/641.15 |
| 2003/0172922 | A1* | 9/2003 | Haber | ................. 126/600 |
| 2008/0073198 | A1* | 3/2008 | Simon | ................... 202/81 |
| 2009/0151771 | A1* | 6/2009 | Kothari et al. | ............ 136/246 |
| 2010/0000596 | A1* | 1/2010 | Mackler | .............. 136/246 |
| 2010/0089433 | A1* | 4/2010 | Conger | ................ 136/244 |

FOREIGN PATENT DOCUMENTS

JP       2003329963 A   *  11/2003

OTHER PUBLICATIONS

Munehira JP2003329963A, English machine translation.*

* cited by examiner

*Primary Examiner* — Susan D Leong
(74) *Attorney, Agent, or Firm* — The Belles Group, P.C.

(57) ABSTRACT

A solar canopy system includes support towers and an upper canopy suspended therefrom, the upper canopy forming a catenary shape. A method of generating electricity includes deploying mirrors upon a canopy that forms a catenary shape, to focus sunlight on a Dewar tube containing a heat transfer fluid, utilizing heat from the sunlight collected within the heat transfer fluid to generate steam, and generating the electricity with a turbine powered by the steam. A method of generating electricity includes deploying first and second photovoltaic cell grids upon a canopy that forms a catenary shape, the second grid being movable relative to the first grid. The method also includes positioning the second grid with respect to the first grid so as to maximize light collection and electricity generation during daylight hours, and repositioning the grids so as to maximize transparency of the canopy during nighttime hours.

18 Claims, 7 Drawing Sheets

SOLAR CANOPY SYSTEMS AND METHODS

CROSS-REFERENCE TO RELATED APPLICATIONS

This application claims priority to U.S. Provisional Patent Application No. 61/488,928, filed 23 May 2011, which is incorporated herein by reference in its entirety.

BACKGROUND

The present disclosure relates to the field of solar energy and to canopy and solar technology. Canopies have historically been utilized to provide shade for an area, and certain canopies have been fitted with various means of generating electrical power. For example, traditional forms of solar concentrators are based on flat or parabolic mirrors. Concentrated sunlight may be focused onto a receiving tower; thermal energy from the concentrated sunlight drives a turbine and generates electricity. In contrast, a typical parabolic trough CSP system uses a linear parabolic reflector to concentrate the sunlight onto a receiver positioned along the trough's focal line. The receiver is a tube (often called a Dewar tube) filled with fluid which, when heated, can similarly be used to drive a turbine and generate electricity. A tracking system may be used on the parabolic trough to ensure that it maximizes solar receipt during daylight as it tracks the sun along a single axis. Traditional technologies motorize the structure in order to ensure that the solar mirrors track the sun's path across the sky and concentrate the maximum amount of solar radiation on a central solar receiving tower or on a central pipe. In these conventional systems, a need to constantly adapt to the sun's moving path across the sky may be met through the employment of a highly mechanized, energy intensive motorized system.

Certain canopies are not as efficient as possible in terms of electrical power conversion and do not address other issues such as dust and dirt collection on reflecting surfaces, and/or liberating heat at night that concentrates in or under the canopy during the day.

SUMMARY

In an embodiment, a solar canopy system includes first and second support towers and an upper canopy suspended at least from the first and second support towers, the upper canopy forming a catenary shape.

In an embodiment, a method of generating electricity includes deploying a plurality of mirrors upon a canopy that forms a catenary shape to focus sunlight on a Dewar tube containing a heat transfer fluid, utilizing heat from the sunlight collected within the heat transfer fluid to generate steam, and generating the electricity with a turbine powered by the steam.

In an embodiment, a method of generating electricity includes deploying first and second grids of photovoltaic cells upon a canopy that forms a catenary shape, the second grid being movable relative to the first grid, each of the first and second grids being operatively configured to generate electricity. The method also includes positioning the second grid with respect to the first grid so as to maximize light collection and electricity generation during daylight hours, and positioning the second grid with respect to the first grid so as to maximize transparency of the canopy during nighttime hours.

DETAILED DESCRIPTION OF DRAWINGS

The present disclosure may be understood by reference to the following detailed description taken in conjunction with the drawings briefly described below. For purposes of illustrative clarity, certain elements in the drawings may not be drawn to scale, and only representative features of several similar features may be labeled. Specific instances of an item may be referred to by use of a numeral in parentheses (e.g., first tower 120(1)) while numerals without parentheses refer to any such item (e.g., towers 120).

Figure 1:
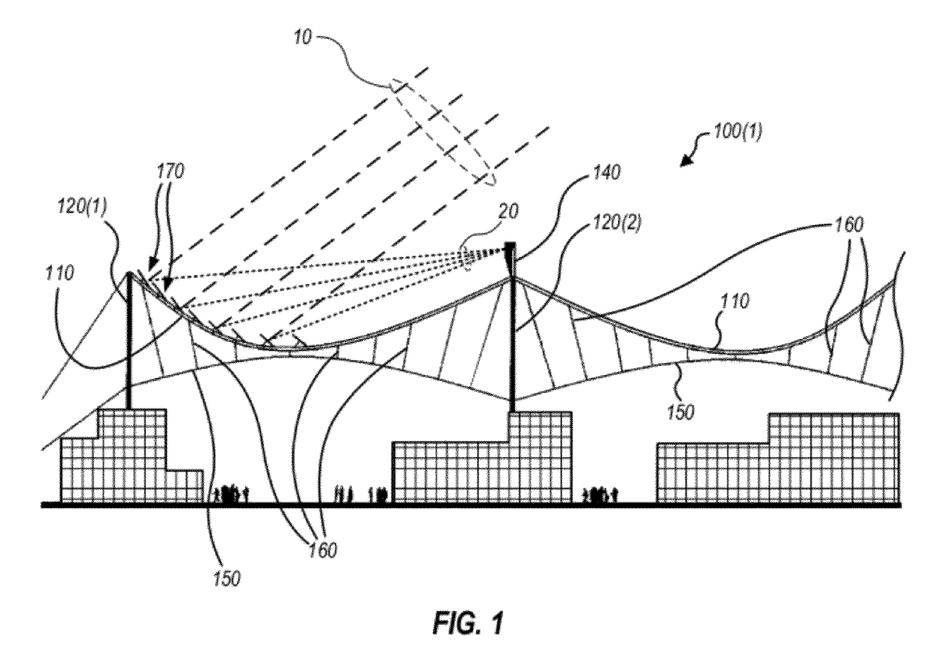
FIG. 1 shows a solar canopy system, according to an embodiment.

Two solar canopy systems are presented herein, one based on CSP (concentrated solar power), and one based on PV (photovoltaic) cells. FIG. 1 shows a solar canopy system 100(1). Solar canopy system 100(1) includes an upper canopy 110 that is supported by first and second support towers 120(1) and 120(2); other features of solar canopy system 100 are discussed further below. Solar canopy system 100(1) integrates energy production from solar harvesting with a retractable/movable structure that is capable of providing shade and ventilation underneath. Solar canopy system 100(1) may function well, for example, in hot desertic climates, where people have traditionally used canopies to protect themselves from solar radiation. Solar canopy system 100(1) provides a cooler microclimate underneath, and will harvest energy at the top and self clean (dust is a major problem while harvesting solar energy in hot desertic climates). Solar canopy system 100(1) accomplishes this through an integrated design that is capable of harvesting solar radiation for energy production, providing shade, is self cleaning. Furthermore, solar canopy system 100(1) produces a see-through effect, permitted by its movable structure (e.g., movable solar mirrors 170, as shown in FIGS. 1 and 2, or photovoltaic cell grids, as discussed below).

1. CSP Solution

Figure 2:
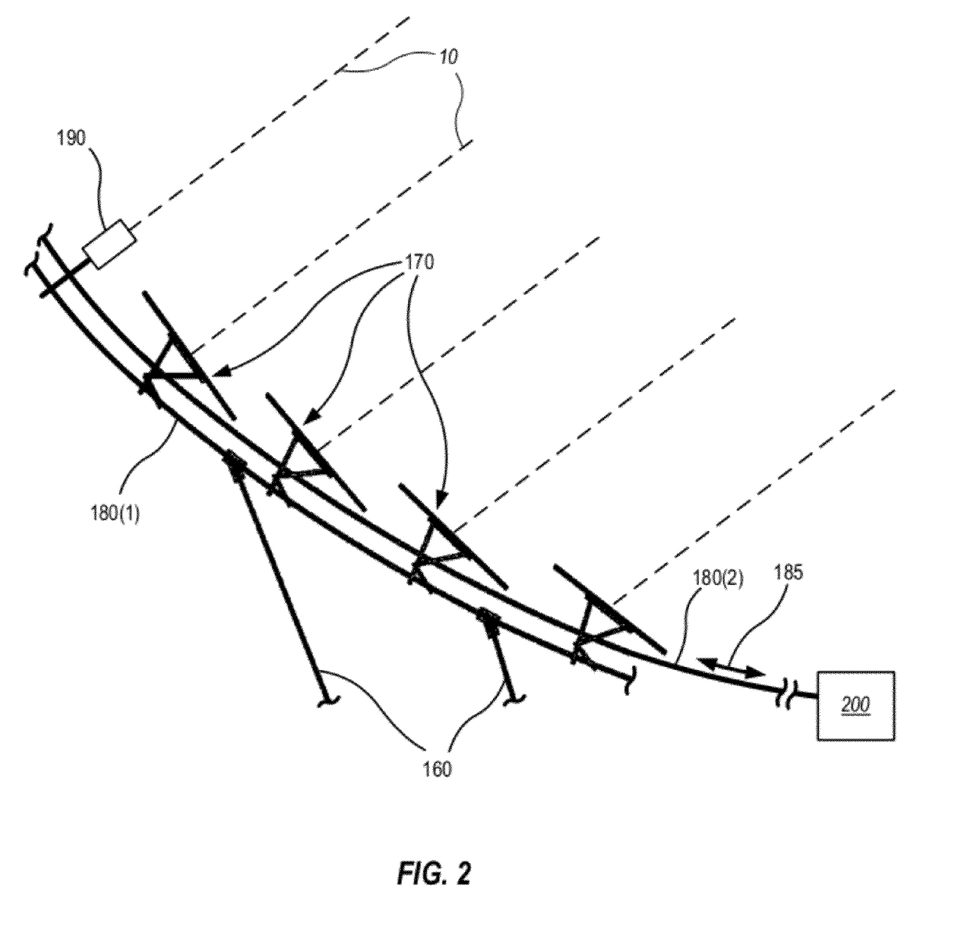
FIG. 2 shows a section of the upper canopy of FIG. 1 with four mirrors mounted thereon, and how the mirrors may be actuated by a single motor.

Solar canopy system 100(1) features an upper canopy 110 including flat mirrors 170 mounted with a special tensile geometry in such a way that mirrors 170 can be moved by simple movement of a cable (see FIG. 2). In doing so, mirrors 170 keep on tracking the sun and concentrating the energy into specific parts of the canopy. Solar canopy system 100(1) can be made of any tensile structure. In some embodiments, the structure includes two hanging canopies, as shown in FIG. 1: an upper canopy 110, and a lower (inverted) canopy 150, connected by tension cables 160 that run generally vertically. Upper canopy 110 and lower canopy 150 each follow the shape of a catenary curve, that is, $z=\cos h(x)$, where x is a horizontal coordinate and z is a vertical coordinate. The catenary curve is utilized for the shape of the upper and lower canopies for two different reasons. In the case of upper canopy 110, the catenary curve closely approximates the shape of an etendue conserving curve (see section 5 below). In the case of lower canopy 150, the inverted catenary shape is an excellent structural shape for an arch, as is known in architecture. Lower canopy 150 is generally made of a high strength material such as steel or aluminum. In the generally horizontal direction, canopies 110 and 150 attach to support towers 120(1) and 120(2). Although FIG. 1 shows solar canopy system 100(1) as including two upper canopies 110, two lower canopies 150 and two towers 120, it is contemplated that a solar canopy system can include any number of canopies 110 and 150, supported by as many towers 120, and connected by as many tension cables 160, as necessary. Solar canopy system 100(1) is now described in more detail.

2. Technical Description of the CSP Solution

Solar canopy system 100(1) includes solar mirrors 170 coupled with upper canopy 110. FIG. 2 shows a section of upper canopy 110 with four mirrors 170 coupled thereto, and how mirrors 170 may be actuated by a single motor 200. Mirrors 170 are pivotably mounted to a first cable 180(1) that forms a catenary shape, secured by tension cables 160, as discussed above. Mirrors 170 also couple with second cable 180(2) that is actuated by motor 200. Since first cable 180(1) is fixed, movements of second cable 180(2) in the direction(s) of arrow 185 adjust an angle of rotation for all of mirrors 170 simultaneously. FIG. 2 represents a position of motor 200 only schematically at an end of cable 180(2); motor 200 may for example be located near one of support towers 120, FIG. 1. An optional sensor 190 senses direction of incoming solar rays 10; information from sensor 190 is utilized to drive motor 200 to keep reflected solar rays focused on a solar collecting tower, as shown in FIG. 1. During nighttime, motor 200 drives second cable 180(2) to orient mirrors 170 to an approximately vertical position, which is beneficial for two reasons. First, gaps formed between mirrors 170 in their near vertical positions facilitate transmission of longwave radiation from below canopy 110 into the night sky to cool the area beneath. Second, the near vertical position of mirrors 170 provides self cleaning of mirrors 170, since any dust or debris that falls onto mirrors 170 during daytime can then simply fall off. It is appreciated that the number and arrangement of mirrors 170, cables 180, motor 200 and sensor 190 shown in FIG. 2 are exemplary only, and these elements can be provided in different number or rearranged as appropriate for a given installation.

As shown in FIG. 2, solar canopy system 100(1) can utilize a single motor 200 to drive cable-based actuation in order to control the positioning of solar mirrors 170 in response to solar position information from optional sensor 190. Solar mirrors 170 can therefore follow the sun's path based on information obtained from one or more sensors 190 in order to maximize receipt of solar radiation at support tower 120(2). That is, one or more of the support towers 120 form solar collecting towers, and mirrors 170 focus incoming solar rays 10 as reflected solar rays 20 onto the solar collecting towers, as shown in FIG. 1.

Figure 3:
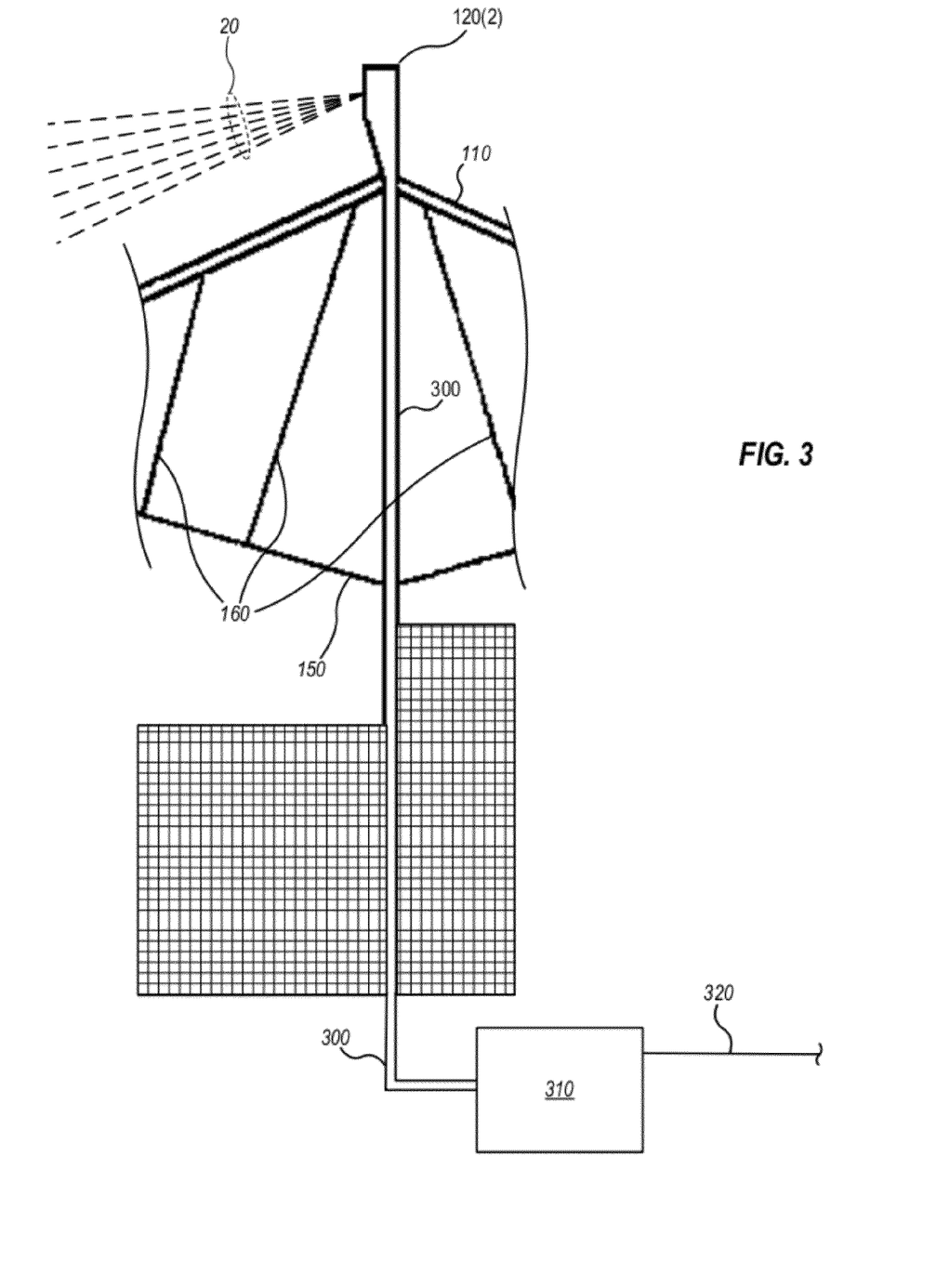
FIG. 3 is a schematic drawing that shows a portion of the solar canopy system of FIG. 1, including one of its support towers and associated components that are utilized to generate electricity.

FIG. 3 is a schematic drawing that shows a portion of solar canopy system 100(1) including support tower 120(2) and associated components that are utilized to generate electricity. Support tower 120(2) is a solar collecting tower and can be located at a central position, or other position, within the solar canopy structure. Solar rays focused by mirrors 170 are concentrated on a collecting tube (e.g., a Dewar tube) 300 that contains a heat transfer fluid, which in turn is used to generate steam and drive a turbine 310 resulting in production of electricity in a power line 320.

Referring again to FIG. 1, according to embodiments, the upper or top catenary is affixed to the tension cables on the inside, which are in turn connected to the lower or bottom inverted catenary, to provide a rigid structure. Solar mirrors are integrated within the upper surface of the upper, hanging catenary. The solar mirrors are used to harvest solar radiation, positioned so as to reflect sunlight to a single point within the canopy's structure. Unlike traditional motorized systems that alter the angle of the solar mirrors to track the sun's path, the relative positioning of the solar mirrors within this system are controlled by cable based actuation. This catenary system requires only a single motor to drive the movement of the mirrors, as shown in FIG. 2, which is a schematic detailed view of a portion of the upper catenary, the mirrors and the mirror actuation cables. By reflecting the solar radiation, the solar mirrors concentrate the solar thermal energy onto a single point, acting as a concentrated solar power system, as shown in FIG. 3. The rigid structure of the catenary system allows a high degree of accuracy in the positioning of the solar mirrors, which in turn ensures maximum efficiency in capturing and concentrating sunlight. Similarly, one or more tracking sensors are optionally built into the upper catenary, allowing the mirrors to follow the sun's path, with a minor adjustment (less than 6 cm) of the mirrors made feasible by cable based actuation, further serving to maximize the concentration of sunlight onto the collecting tower. The collecting tower has at least two purposes: to provide support to the catenary system, and to act as a central receiver for the reflected, concentrated sunlight. The collecting tower contains a Dewar tube, which in turn contains a heat transfer fluid. As this fluid is heated by the concentrated solar radiation, it is in turn used to generate steam, which drives a turbine, and produces high grade energy in the form of electricity. During the night the mirrors are rotated vertically, so that the clean themselves and maximize the amount of long wave radiation from the earth to the sky—hence ameliorating the thermal balance of the terrain underneath the canopy and providing a cooler microclimate.

3. PV Solution

A second embodiment of a solar canopy system employs a similar overall structure, but a difference between the first system and the second system is the way of collecting energy, now based on PVs. However, if one were to cover the whole surface of a tensile membrane with PVs, several issues may occur:

people would not be able to see the sky anymore the canopy would get very hot (PVs convert a fraction of solar energy into electric energy, but an even larger fraction into heat)

the radiative loss during the night (e.g., the amount of long wave radiation from the earth to the sky) would be reduced, increasing the temperature of the terrain below.

Figure 4A:
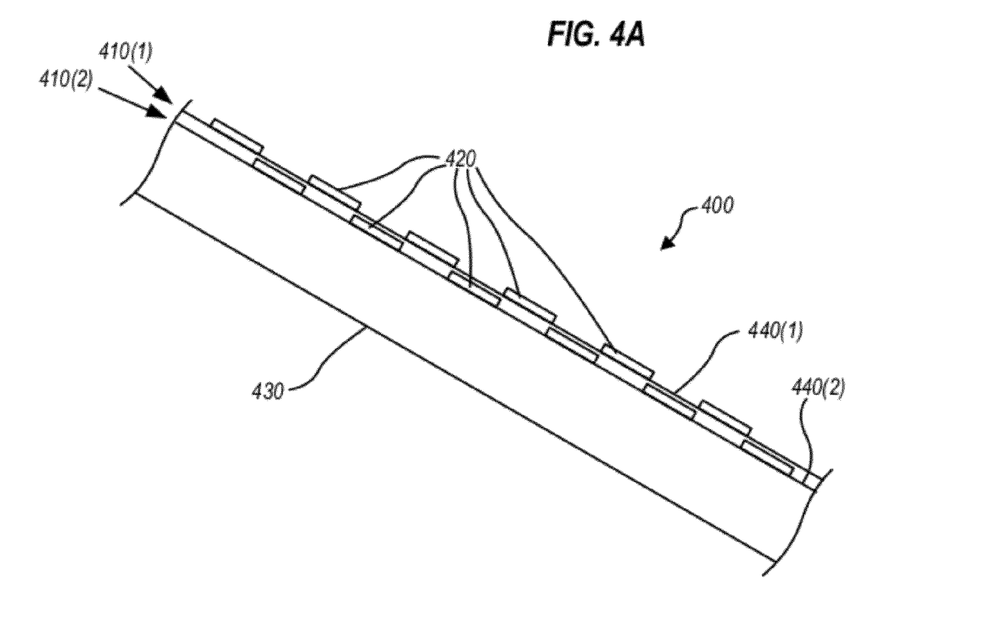
FIGS. 4A and 4B schematically illustrate alternate positions of a section of a double membrane structure of a solar canopy system based on PV cells, according to an embodiment.
Figure 4B:
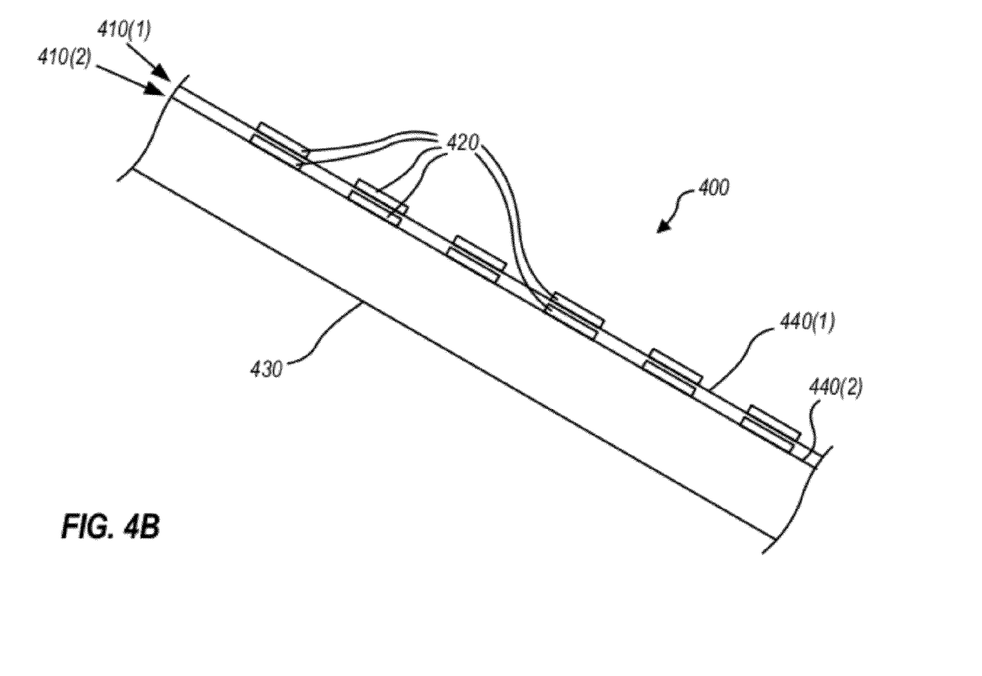

In the PV solution now described, the canopy includes multiple layers of PV cells in gridlike patterns that harvest solar energy, and can open and close when the layers make small movements relative to one another (see FIGS. 4A, 4B). Also, a lower membrane is added, made of an insulating material that serves to trap the solar energy that is not harvested by the PV cells, thus creating a layer of heat between the two membranes. The double membrane form encourages convection currents to dispel the hot air around the PV grids, and may also help to produce a slight breeze in the underlying region.

4. Technical Description of the PV Solution

An embodiment is shown again based on a double catenary system. The system according to the inventive concept has a similar overall structure to the first system, with a dual catenary structure fixed together by tension cables and additional support from columns. Similar to the first system, the second system is semi-retractable/movable, can produce energy through solar harvesting and is capable of providing shade and ventilation.

FIGS. 4A and 4B schematically illustrate alternate positions of a section 400 of a double membrane structure of a solar canopy system based on PV cells. Section 400 can form part of an upper canopy of a solar canopy system. Each of a first layer 410(1) and a second layer 410(2) includes PV cells 420 coupled with respective structures 440(1), 440(2). At least one of layers 410(1) and 410(2) is movable with respect to the other, so that relative positions of PV cells 420 can be adjusted. It is appreciated that one of layers 410 may be fixed and the other layer 410 movable with respect to the fixed layer, or both layers 410 may be movable. FIG. 4A shows layers 410(1) and 410(2) aligned such that PV cells 420 alternate in position with one another, while FIG. 4B shows layers 410(1) and 410(2) aligned such that PV cells 420 are stacked relative to one another. The ability to alternate or stack positions of PV cells 420 allows an operator of the solar canopy system to maximize electricity generation by the PV cells during the daytime (by maximizing solar radiation captured by PV cells) and to maximize transparency of section 400 as viewed from a distance (by stacking the PV cells to provide a maximum of free space between the PV cells) at nighttime. Maximizing the transparency of the canopy allows for viewing the sky, and for transmission of long wave radiation (e.g., radiative heat loss from warm surfaces) through the canopy, at night. Both FIGS. 4A and 4B also show an insulative layer 430 below layers 410(1) and 410(2). Insulative layer 430 thermally insulates the space below the upper canopy from layers 410(1) and 410(2), since PV cells 420 will generate heat in addition to generating electricity. Insulative layer 430 need not be a perfect thermal insulator, but should at least substantially isolate air above it from air below it; the air thus isolated above it will naturally form convective currents that pull heat upwards and away from the canopy instead of dissipating the heat down towards the ground below. Insulative layer 430 may also be transparent to facilitate visibility of the sky above, and transmission of longwave radiation therethrough, when layers 410(1) and 410(2) are positioned as shown in FIG. 4B.

Figure 5:
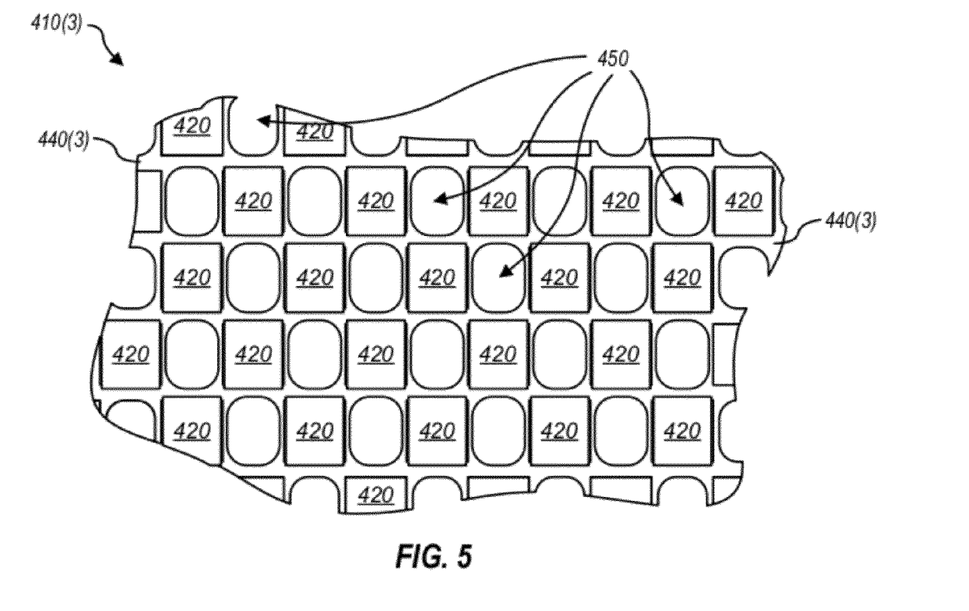
FIG. 5 schematically shows a portion of a layer that could be utilized as one of the layers shown in FIGS. 4A, 4B, according to an embodiment.

FIG. 5 schematically shows a portion of a layer 410(3) that could be utilized for layer 410(1) and/or layer 410(2), FIGS. 4A, 4B. PV cells 420 mount with structure 440(3), as shown. Structure 440(3) forms apertures 450 therethrough, so that two layers like layer 440(3) can be positioned with the apertures aligned for visibility and/or transmission of longwave radiation therethrough. Although FIG. 5 shows layer 410(3) laid out with PV cells 420 forming a "checkerboard" type pattern, it is appreciated that other repeating layouts such as rows of PV cells 420 with spaces between the rows, or hexagonal grids or other types of grids, may be utilized. Furthermore, although FIGS. 4A, 4B and 5 suggest that PV cells may cover approximately 50% of the area of each of two layers 410, other embodiments may feature larger numbers of layers with lower percentage areas covered by PV cells, such that alignment of all of the layers with the PV cells stacked may result in higher percentages of open area at night.

The mesh like system of grid elements allows for a responsive surface, and is capable of producing varying degrees of shading. The PV cells that are integrated within the upper membrane of the catenary harvest solar energy and produce electricity on exposure to sunlight. In order to maximize solar receipt during daylight hours, the grids remain closed, that is, the grids are moved such that almost all available sunlight falls on the PV cells. This also serves to provide shade to the under-canopy area. During the night the grids open up, that is, the grids are moved such that the PV cells generally overlay one another and the spaces therebetween also open up. If one had a 4 layer set of grids one would be able to open it up to provide an open area of approximately 75%. While opening and closing, also, one cleans the PVs from dust—a major problem in hot desert climates. The lower membrane is an insulating layer, and creates a cavity between the two membranes. The solar energy that is not captured by the PV cells gathers as thermal energy between the membranes, and is restricted from permeating the canopy catenary structure by the insulation. In order to facilitate the removal of this layer of heat, the double membrane form allows for the creation of convection currents which dispel the hot air and also help to produce a slight breeze in the underlying region. The upwards flow of hot air draws in cooler air into the cavity, in turn creating a breeze in the under canopy area. The mobility of the grids also enables the canopy to be opened at night, allowing heat trapped below to dissipate and enhancing outgoing radiation.

5. CSP Solution with Conservation of Etendue 5.1. Introduction

In the public eye photovoltaic (PV) cells are the face of solar energy. This reflects the reality of solar energy production in the world—at date PV produces about 40 GW per year worldwide while its major alternative—concentrated solar power (CSP)—produces approximately 1.17 GW at a few plants, mostly in Spain and in the United States. PV is also relatively cheaper than CSP and has a great flexibility in how and where it may be installed. In fact, personal PV systems are becoming ever more popular and it has been shown that a rooftop solar PV system in Los Angeles is cheaper than even the most cost-effective CSP plant in the world—the PS10 solar power tower in Spain.

However, this disparity between the two technologies does not tell the whole story. In the race to improve solar collection technology, CSP has been left in a more rudimentary state, and its considerable potential has remained untapped. While today CSP exists only on large-scale power plants far from urban areas, we find that it may be uniquely suited for integration into urban architecture in hot climates. In addition to collecting solar energy, CSP offers the possibility of creating cool spaces underneath its cover; as opposed to PV cells—which transform a large fraction of incoming solar energy into heat—CSP uses mirrors which reflect incident light away. In the sun-soaked regions of the world where solar energy production is most feasible the creation of cool, sheltered spaces is one of the main goals of architecture, and CSP may be tailored to provide this function.

In an embodiment, a Solar Concentrating Roof (SCR) is provided utilizing one form of CSP-Compound Linear Fresnel (CLFR) technology. We consider how the solar collection efficiency of the roof may be maximized together with the capacity of the roof for climate control and other architectural concerns. By designing to reflect solar energy away while letting long-wave radiation through, the roof will create an optimum climate, following in the vein of the domes which Buckminster Fuller proposed could cover an area of Manhattan or the entire city of Winooski, Vt. (USA). Architecturally, the design will be light and inexpensive to build. Maximization of energy collection will be driven by the concept of the "conservation of etendue" of the incoming light. Our design optimizes functionality by considering maximum energy collection, climate control, and architecture together.

6. Energy Collection 6.1. Conservation of Etendue

A recent study by Chaves and Collares-Pereira shows how imposing the conservation of the optical quantity etendue on a CLFR reflector can lead to the development of new, potentially more efficient forms for the reflector. Etendue is an important concept in non-imaging optics. Essentially it is the space—area and angular area—which light occupies at a given point along its path. Etendue can increase but cannot decrease; this is based on the physical principle that concentrated light can be diffused while diffuse light cannot be reconcentrated. If etendue could be decreased then light coming from a finite source could be focused into an infinitely small area, infinitely high concentrations of energy could be attained, and the second law of thermodynamics would be violated. Therefore the etendue of light as it enters an optical system sets an upper limit for the concentration which can be achieved. CSP optics therefore work at their greatest efficiency when etendue is conserved. CSP solutions such as parabolic mirrors and converging lenses which do not conserve etendue always fall short of the maximum concentration. Etendue is defined (in two dimensions) as:

$$U = 2nS \cos \gamma d\theta \quad (1)$$

where n is the index of refraction of the medium, S is the area (length in two dimensions) which the light strikes or passes through at an angle $\gamma$ to the normal of the surface, and $d\theta$ is the half-angle aperture (solid angle) of the light.

Figure 6:
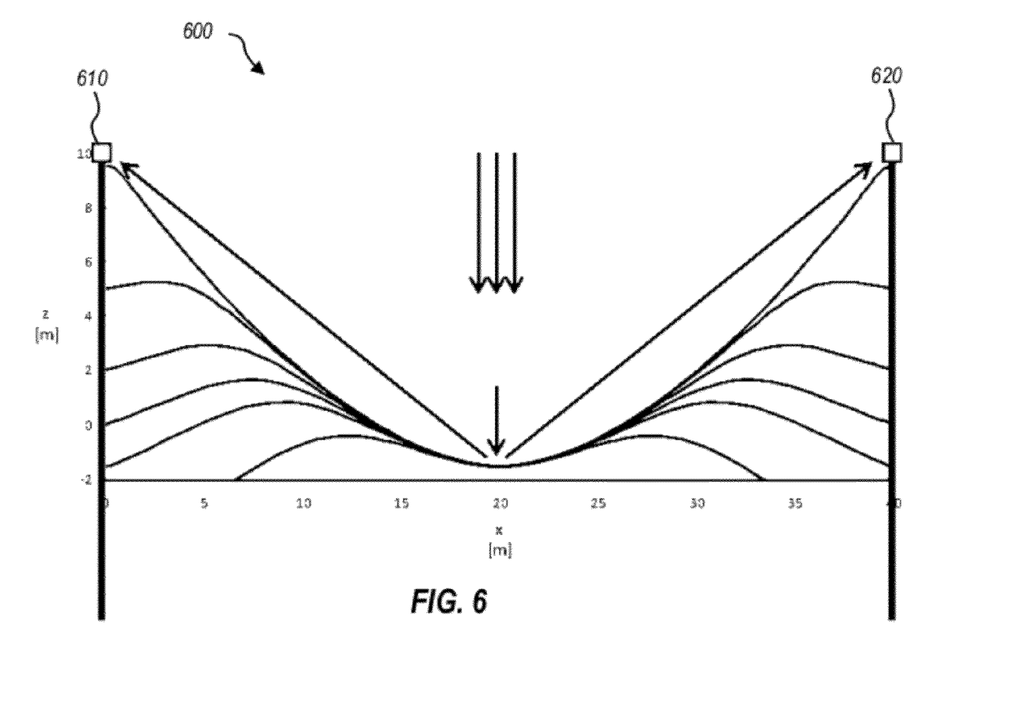
FIG. 6 is a graph of a set of curves derived from a differential equation (Eq. 6) that conserves etendue for a canopy that focuses vertically received sunlight onto two receivers, according to an embodiment.

Our problem is two-dimensional—two tower receivers with a field of heliostats between them. The heliostats are infinitely small and are alternatedly directed at the two receivers such that incident light at any point is split and directed to both receivers. The local slope is optimized such that etendue is perfectly conserved before and after incidence, that is:

$$dU_I = dU_L + dU_R \quad (2)$$

where $dU_I$ is the etendue of the incident light at a point P on the surface and $dU_L$ and $dU_R$ are the etendue of the light reflected from this point towards the tower receivers at the left and right-hand side of the heliostat field, respectively. The etendue of the incident radiation is:

$$dU_I = 2dl \cos \alpha \sin \theta \quad (3)$$

and similarly:

$$dU_L = 2dl \cos(\phi_L - \alpha)\sin \theta \quad (4)$$

$$dU_R = 2dl \cos(\phi_R + \alpha)\sin \theta \quad (5)$$

Where $\phi_L$ and $\phi_R$ are the angle which the light reflected to the left and right receivers, respectively, make with the vertical. As such, $\phi_L$ and $\phi_R$ will be functions of the position of point P and the parameters of the system (span, height of receivers). Given that the solid angle of the radiation remains the same before and after reflection, the conservation of etendue dictates that the area (or in the 2D problem, the length) which the light passes through before reflection must be equal to the sum of the two areas which the light passes through after reflection. Consideration of Eq. (2) together with Eqs. (3), (4), and (5) leads to a differential equation:

$$\frac{dy}{dx} = \frac{1 - \cos\phi_L - \cos\phi_R}{\sin\phi_L - \sin\phi_R} \quad (6)$$

which, given an initial value, defines the shape of an etendue-conserving curve. Chaves and Pereira find one solution of the differential equation; perhaps the solution which is optimal for a structure constructed on the ground. But, as we will show, other solutions may be of interest in the design of an elevated structure. FIG. 6 is a graph 600 that shows a set of curves derived from Eq. 6 for a canopy that focuses vertically received sunlight onto a left side receiver 610 and a right side receiver 620. We explore the range of possible solutions—as shown in FIG. 6, the midpoint of these curves remains constant while the initial value gives rise to a wide-array of shapes closer to the towers. This is because along the symmetry axis of the system $\phi_L = \phi_R$ and therefore from Eq. (6) we have:

$$\cos \phi_L = \cos \phi_R = 0.5 \quad (7)$$

which can only be satisfied by one point, where we will have $\phi_L = \phi_R = 60°$ and, consequentially, $$\frac{dy}{dx} = 0.$$

Figure 7:
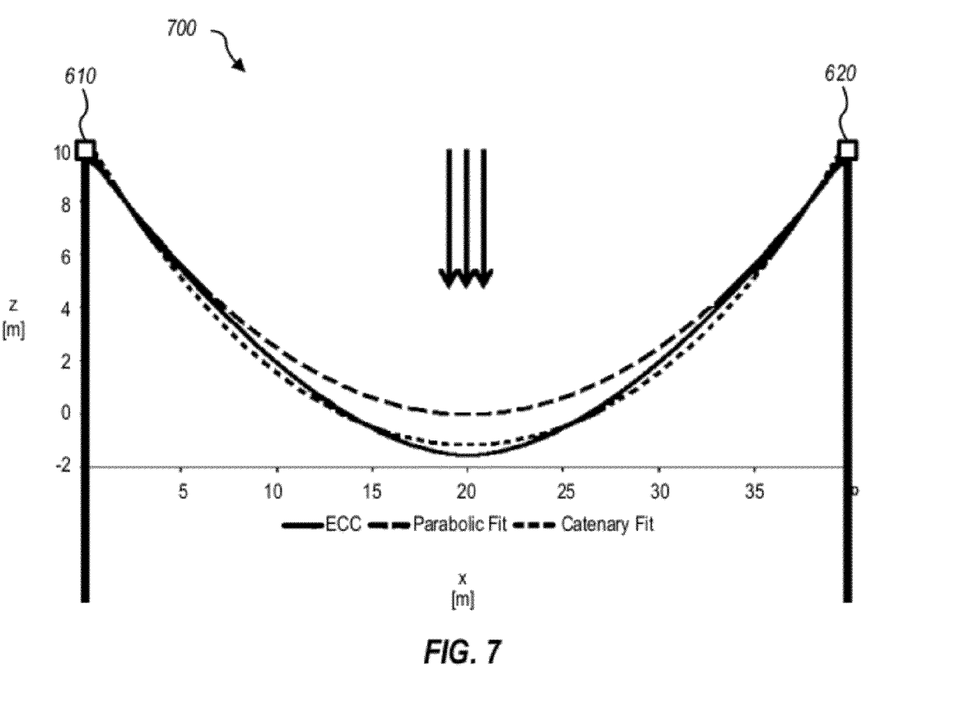
FIG. 7 is a graph comparing a catenary curve, an etendue conserving curve (ECC) and a parabolic curve that can be formed between the receivers of FIG. 6, according to an embodiment.

Outside of this point there are an infinite number of solutions. FIG. 7 is a graph 700 comparing a catenary curve, an etendue conserving curve (ECC) and a parabolic curve that can be formed between the receivers 610, 620 (FIG. 6). A solution with an initial value of y(0)=0.95h (h is the height of the tower above the arbitrary y=0 elevation. N.B. y=0 does not correspond to ground level) is nearly a catenary curve, as shown in FIG. 7, which also compares this curve with a parabolic fit.

We can go further and calculate the energy flux incident at the point P:

$$d\Phi_I = L dU_I \quad (8)$$

where L is the radiance of the radiation. Etendue is conserved, and if we assume that there is no absorption, radiance is as well. Therefore flux will be conserved and the total flux collected H will be:

$$H = \int d\Phi_I \quad (9)$$

$$= 2L\sin\theta \int dx \quad (10)$$

$$= 2L\sin\theta W \quad (11)$$

We conclude that for an etendue-conserving curve the amount of solar energy collected will not depend on the shape of the solution.

6.2. Variation of Sun Zenith Angle

We can also generalize the solution to accommodate radiation arriving from different sun zenith angles—the current solution considers only direct overhead radiation. $\theta_Z$ is 90° when the sun is in the east, 0° when the sun is over-head (noontime) and −90° when the sun is in the west. The etendue of the incident radiation is now:

$$dU_I = 2di\, \cos(\alpha + \theta_Z)\sin\theta \tag{12}$$

but the etendues of the reflected radiation have the same definition, as the direction of the reflected light remains unchanged:

$$dU_L = 2dl\, \cos(\phi_L - \alpha)\sin\theta \tag{13}$$

$$dU_R = 2dl\, \cos(\phi_R + +)\sin\theta \tag{14}$$

and the differential equation for the etendue-conserving curve becomes:

$$\frac{dy}{dx} = \frac{\cos\theta_Z - \cos\phi_L - \cos\phi_R}{\sin\theta_Z + \sin\phi_L - \sin\phi_R} \tag{15}$$

Figure 8:
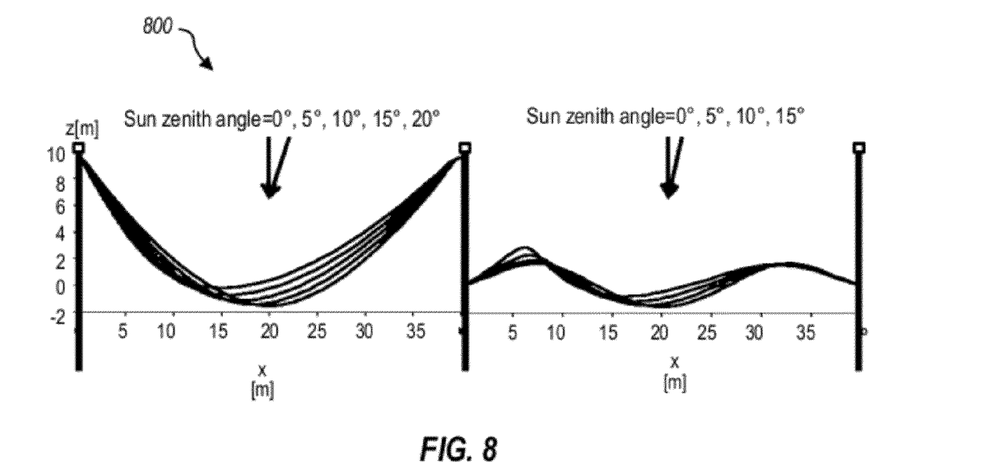
FIG. 8 is a graph showing solutions to a differential equation for an etendue-conserving curve (Eq. 15) with sun zenith angle as a parameter, according to an embodiment.

FIG. 8 is a graph 800 showing solutions to Eq. 15 with sun zenith angle as a parameter.

6.3. Corrections

The radiance of light is reduced by absorption as it travels through the earth's atmosphere. This reduction is referred to as air mass and has been approximated as:

$$AM(t) = \frac{1}{\cos\theta_Z(t) + 0.50572(96.07995 - |\theta_Z(t)|)^{-1.6364}} \tag{16}$$

where $\theta_z$ is expressed in degrees. We incorporate the air mass reduction into the radiance:

$$L(t) = \frac{L(0)}{AM} \tag{17}$$

and we can therefore find the total energy collected by the two receivers at any time t:

$$H(t) = \int d\Phi_I(t) = \int L(t)\, dU_I(t) \tag{18}$$

$$= \frac{2L(0)\sin\theta}{AM} \int dl\cos(\alpha + \theta_Z) \tag{19}$$

$$= \frac{2L(0)\sin\theta\cos\theta_Z W}{AM} = \frac{H(0)\cos\theta_Z}{AM} \tag{20}$$

Figure 9:
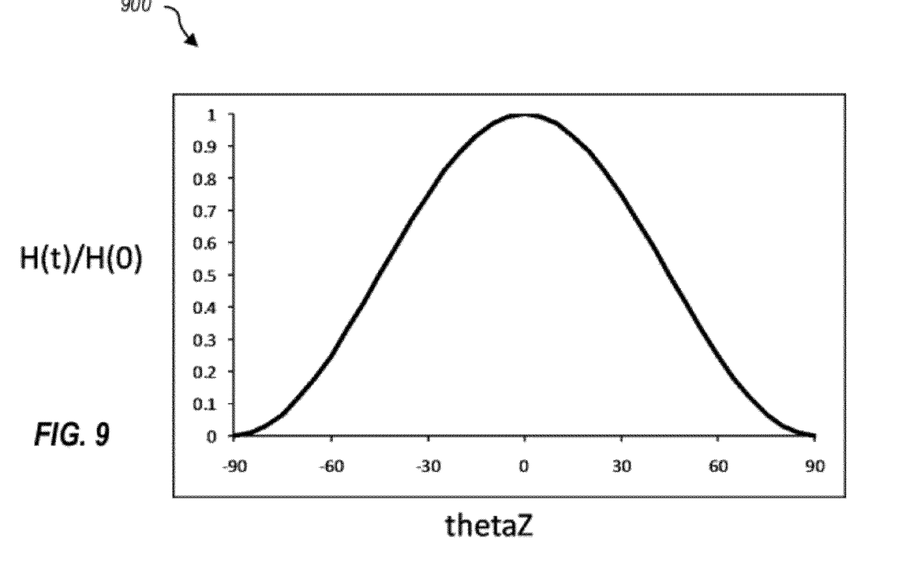
FIG. 9 is a graph that shows how the energy collected varies as a function of sun zenith angles, given an optimal ECC curve at each time of day, according to an embodiment.

Note that the correction generally known as the cosine effect is automatically included in the calculations through Eq. (12). FIG. 9 is a graph 900 that shows how the energy collected varies as a function of $\theta_z$, given an optimal ECC curve at each time of day. Note that FIG. 9 is normalized to the maximum energy collected when the sun is at its highest point of the day, the energy collected at other times is given as a fraction of this maximum energy.

7. Climate Control

We noted earlier that the Concentrated Solar Canopy is an expensive option when compared with more conventional photo-voltaic approaches. But this may be a somewhat restricted perspective.

The CSL is a fundamentally more attractive option in that the heat is at high temperature as it is used to produce electricity; a high efficiency process. Of course the large array of carefully placed mirrors is expensive but this can be mitigated in part by finding a use for a large array of carefully placed mirrors, e.g., they should make an excellent reflector for incoming short wave radiation.

Turning to related architecture we note that the same pressures that have led to research and improvement of photovoltaics have also led to a reconsideration of building design with particular attention to the heating, cooling and ventilating of buildings. Concurrent with this has been a reinvigorated interest in space and the nature of space influencing current working and living patterns.

Central to these concerns is the general requirement of getting the right kind of energy at the right place and at the right time as a guide to sustainability. An inversion of this is to ensure that you don't have the wrong energy where you don't want it when you don't want it. In a hot or very hot climate and during the day the buildings will absorb and reflect short wave radiation from the sun thereby increasing the buildings temperature. Some of this will be re-radiated as long wave radiation and some transferred to the air surrounding the building. Both the direct human impact of incoming short wave radiation, the increased building temperature and the increased air temperature. all act to make the environmental temperatures uncomfortable in the extreme.

Experience shows that the incoming short wave radiation is particularly uncomfortable and we typically remain inside during much of the day, stay in shadow when outside or erect some, possibly light weight, structure to provide shade. To an extent though this still leaves the heated air and the heated building to contend with.

At night there is no incoming short wave radiation but the air and the building remain hot. The shade canopy is now somewhat of an inconvenience as it is likely to trap outgoing longwave radiation from the buildings and to trap the heated air even if it is hot and positively buoyant. Additionally the shade canopy reduces the possibility of wind flushing the hot air out of the urban canopy.

Figure 10:
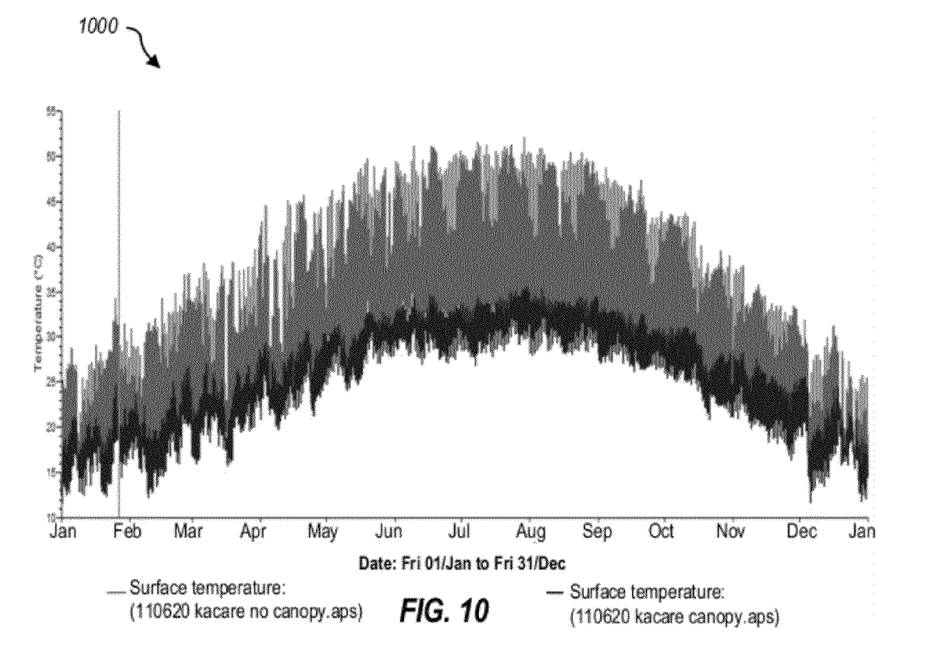
FIG. 10 is a graph showing the results of a calculation undertaken for a generic building, meteorology and solar loading, with and without a solar canopy system, according to an embodiment.

The obvious solution is to remove the shade canopy at night. Thus the CSL becomes a very attractive option if the shade canopy can provide shade and energy during the day and can be moved or altered (through limited movement) to provide substantial cooling and reduction in temperature of the urban canopy of buildings and the air within the urban canopy. FIG. 10 is a graph 1000 showing the results of a calculation undertaken for a generic building, meteorology and solar loading, with and without a solar canopy system. In FIG. 10, simulation results with a canopy are shown in black while simulation results without a canopy are shown in gray. The building surface temperatures (and presumably the ground surface temperatures) have a range of about 25 C reaching up to 50 C while the shade canopy reduces the building temperature range to about 5 C with maximum temperatures of 30 C. These are changes that are worth exploiting, particularly if they are obtained together with a very substantial source of power.

Finally, we can note that active Climate Control as described above will result in reduced energy consumption in the cooling of buildings and thereby likely impinge on concerns about Climate Change; Climate Control and possible Climate Change are strongly intertwined.

8. Implementation

A number of practical considerations must be made—the transformation of the ideal etendue conserving curve into a real optic will imply some loss in the theoretical efficiency.

8.1. Inter-Mirror Blocking

In reality the continuous curve of infinitesimal points is a series of pleated mirrors. This real optic will not conserve completely etendue as there will be a small amount of blocking between mirrors. We have developed a criteria to understand where there will be blocking:

$$\frac{\phi_L}{2} + \phi_R <= 90° \quad (21)$$

$$\frac{\phi_R}{2} + \phi_L <= 90° \quad (22)$$

These equations can be reduced to their dependencies on x and y, showing how the potential for inter-mirror blocking depends on their location relative to the receivers.

$$\frac{x}{h-y} - \frac{h-y}{w-x} <= 0 \quad (23)$$

$$\frac{w-x}{h-y} - \frac{h-y}{x} <= 0 \quad (24)$$

From inspection of the equations it is clear that blocking will be reduced as the vertical distance from the receivers, h−y, is increased. Therefore blocking will be a problem in the upper parts of the space. Furthermore, the product of the terms x and w−x will be greatest in the center of the space, which means that the center of the optic will be another potential problem area for inter-mirror blocking.

8.2. Sun Tracking

The solar roof must have some capacity to track the sun throughout the day—either through rotation of the mirrors or transformation of the curve. Structurally the second idea appears more complex, and so we consider the rotation of mirrors. The blocking criteria will become:

$$\frac{\phi_L}{2} + \phi_R - \frac{\theta_z}{2} <= 90° \quad (25)$$

$$\frac{\phi_R}{2} + \phi_L + \frac{\theta_z}{2} <= 90° \quad (26)$$

$\theta_z$ varies from −90° to 90°, and so it seems that it will alternately alleviate and exacerbate blocking.

The changes described above, and others, may be made in the solar canopy systems and methods described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A solar canopy system, comprising:
   first and second support towers;
   an upper canopy suspended at least from the first and second support towers, the upper canopy comprising a catenary shape;
   a lower canopy suspended from at least one of the first and second support towers the lower canopy comprising an inverted catenary shape; and
   tension cables that connect the lower canopy and the upper canopy such that the upper canopy is rigid.

2. The solar canopy system of claim 1, the first support tower forming a collecting tower, and further comprising a plurality of mirrors mounted with the upper canopy such that the mirrors focus solar rays on the collecting tower.

3. The solar canopy system of claim 2, the upper canopy comprising a first cable forming the catenary shape, the mirrors being pivotably mounted with the first cable.

4. The solar canopy system of claim 3, further comprising a second cable operatively configured to adjust an angle of rotation of each of the mirrors, simultaneously for all of the mirrors.

5. The solar canopy system of claim 4, the second cable being operatively configured to adjust the angle of rotation of each of the mirrors to an approximately vertical nighttime position.

6. The solar canopy system of claim 4, further comprising one or more tracking sensors that provide information utilized to adjust the second cable relative to the first cable, to adjust the angle of rotation of each of the mirrors.

7. The solar canopy system of claim 2, the collecting tower including a Dewar tube containing a heat transfer fluid that accumulates heat from the sunlight, the system further comprising a power generation subsystem that utilizes heat collected in the heat transfer fluid to generate steam to drive a turbine and generate electricity.

8. The solar canopy system of claim 1, the lower canopy further comprising an insulating layer.

9. The solar canopy system of claim 1, the lower canopy further comprising apertures such that an observer below the lower canopy can see through at least portions of the lower and upper canopies.

10. The solar canopy system of claim 1, the upper canopy further comprising a first layer of photovoltaic cells that are arranged in a first grid pattern, for generating electricity from sunlight incident thereon during daytime.

11. The solar canopy system of claim 10, the upper canopy further comprising a second layer of photovoltaic cells that are arranged in a second grid pattern, for generating electricity from sunlight incident thereon during daytime.

12. The solar canopy system of claim 11, further comprising means for moving the second grid pattern with respect to the first grid pattern, and wherein the first and second grid patterns are offset such that
   moving the second grid pattern into a first position with respect to the first grid pattern maximizes electricity generation by the photovoltaic cells, and
   moving the second grid pattern into a second position with respect to the first grid pattern maximizes transparency of the upper canopy as viewed from a distance.

13. The solar canopy system of claim 10, the upper canopy further comprising an insulating layer that is suspended beneath the first plurality of photovoltaic cells to create convection air currents around the photovoltaic cells.

14. The solar canopy system of claim 13, wherein the insulating layer is transparent.

15. A solar canopy system, comprising:
   first and second support towers;
   an upper canopy suspended at least from the first and second support towers, the upper canopy comprising a catenary shape; and
   a lower canopy suspended below the upper canopy, the lower canopy having an inverted catenary shape.

16. The solar canopy system of claim 15, wherein the lower canopy is coupled to the upper canopy such that the upper canopy is rigid.

17. The solar canopy system of claim 15, wherein the lower canopy is coupled to the upper canopy by tension cables such that the upper canopy is rigid.

18. The solar canopy system of claim 15, wherein the lower canopy is suspended from at least one of the first and second support towers.

* * * * *